April 15, 1958 A. F. SMOOT ET AL 2,830,497
PRESSURE RELEASE DETENT
Filed May 31, 1955
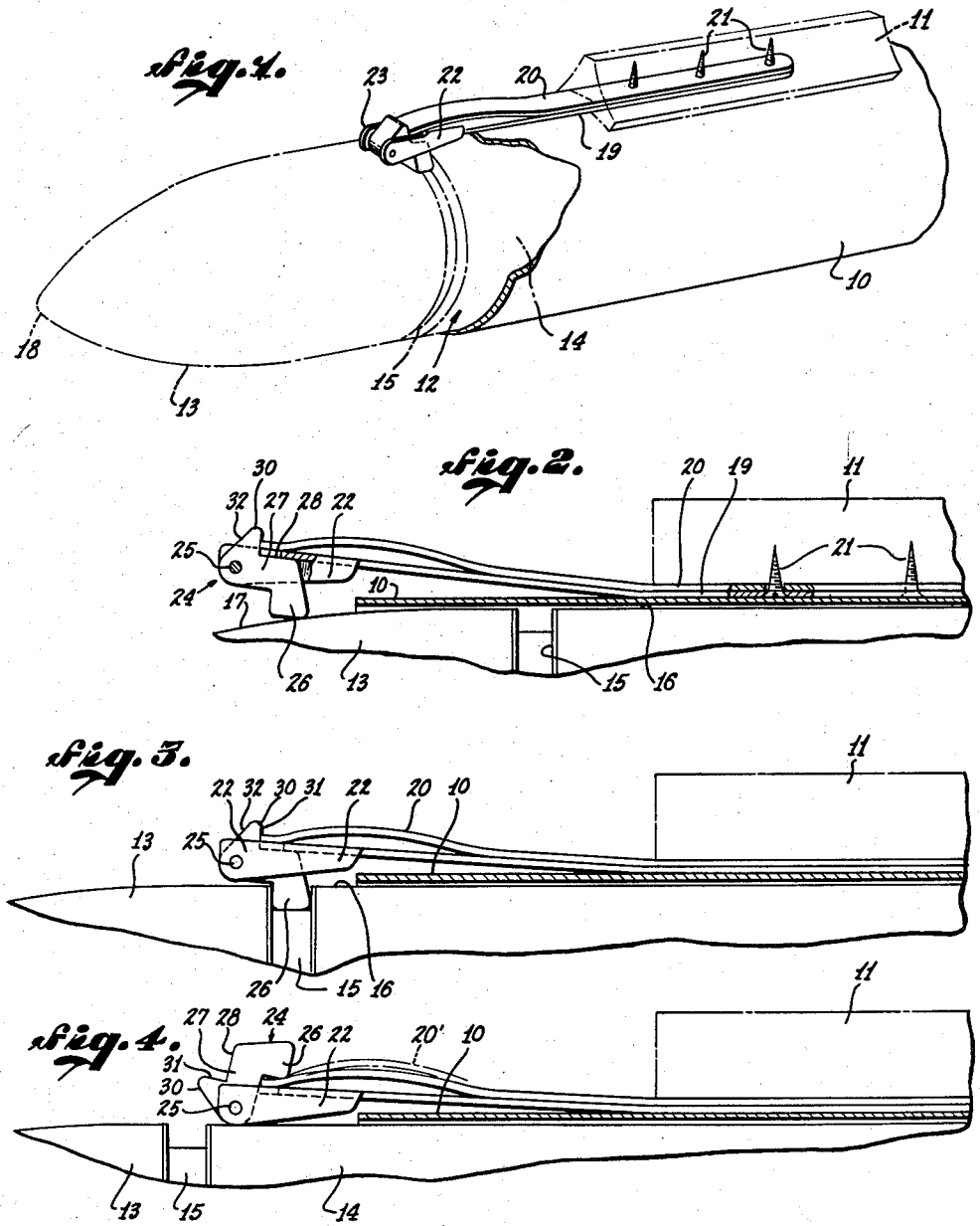
ARREN F. SMOOT &
HARRY S. SWITHERS,
INVENTORS.
Huebner, Beehler,
Worrel & Herzig.
ATTORNEYS.

United States Patent Office 2,830,497
Patented Apr. 15, 1958

2,830,497

PRESSURE RELEASE DETENT

Arren F. Smoot, San Fernando, and Harry S. Swithers, Granada Hills, Calif., assignors to Century Engineers, Inc., Burbank, Calif., a corporation of California Application May 31, 1955, Serial No. 512,164

3 Claims. (Cl. 89—1.7)

The invention relates to rocket launchers and has particular reference to a detent or clip by means of which rockets are retained in tubes in a launcher until the rocket is ready to be fired or until for some reason it be advisable to unload the unfired rockets. The invention is an improvement over certain forms of co-pending application Serial No. 423,618, filed April 16, 1954.

With the advent of rockets adapted to be carried and fired from airplanes has come the development of a variety of different kinds of rocket launchers. The most general characteristic of such launchers is that of a casing so constructed that it is capable of containing a number of rockets in parallel grouping, the casing as a rule containing certain mechanism adapted to the firing of the rockets in a predetermined and desired order. Launchers of this kind have necessitated provision of clips whereby rockets could be held safely and securely in the launcher until the time arrives for their release. Inasmuch as rockets carry explosive charges, considerable care has been exercised in anchoring in effect the rockets in the launchers so that they cannot become inadvertently loosened until a proper time but the same care is also needed to provide a mechanism acting with a satisfactory degree of certainty to positively release the rocket when the time comes for firing. Because of these demands somewhat complex detents have been resorted to which by reason of their lack of simplicity have defeated some of the primary aims in that they are not sure of release under all circumstances and furthermore are such that rockets once loaded can be unloaded only with difficulty. Rockets carried by permanent or non-disposable launchers have been those chiefly equipped with detents having the undesirable characteristics.

It is therefore among the objects of the invention to provide a new and improved detent for rocket launchers which is positive in its action both with respect to holding rockets in place in the tubes provided for them until the time comes for launching and also being positive acting when the rocket is to be released.

Another object of the invention is to provide a new and improved detent for rockets held in tubes in a rocket launcher which is sufficiently sensitive to release at the time of firing to make certain that a rocket will be released from the tube once it has been fired.

Still another object of the invention is to provide a new and improved releasable detent for holding rockets in tubes in a launcher which permits the rockets to be easily loaded and engaged with the detent and which is especially adapted for front loading, the detent furthermore being so constructed that the rocket can be easily unloaded by hand when the launcher needs to be disarmed.

Still another object of the invention is to provide a new and improved rocket launcher detent which while providing a positive grip on the rocket for transportation purposes and a positive release for the rocket upon the rocket being fired is moreover so designed that as the rocket leaves the launching tube there will be no inadvertent scoring of the exterior surface of the rocket whether the rocket leaves upon being fired or whether it is removed by hand.

Also among the objects of the invention is to provide a new and improved detent clip for rocket launchers which is simple and inexpensive in construction and which is so designed that it can be easily mounted in a tube occupying a relatively minimum amount of space and which needs no special construction of the tube to be operable, the clips being such that they are well adapted to use in launchers having a multiple number of tubes.

Further included among the objects of the invention is to provide a new and improved detent clip for rocket launchers so constructed that there is a clip provided for each rocket holding tube with a detent thereon so arranged that, though positively holding the rocket in place, it will be moved to a position substantially out of contact with the exterior wall of the rocket while it is being fired, thereby to avoid any marring or scratching of the exterior surface.

Further included among the objects of the invention is to provide a new and improved positive acting and inexpensive detent clip especially well adapted to enable loading of rocket tubes from the rear of the tube but at the same time permitting easy unloading of the rockets from the tubes by hand should it be desired to disarm the launcher.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a partial front end perspective view of a rocket launcher tube partially broken away and showing the detent clip in engagement.

Figure 2 is a side elevational detailed view of the detent clip with a portion broken away and showing the tube in section with a rocket therein at a position immediately prior to engagement of the rocket with the detent clip upon being loaded.

Figure 3 is a view similar to Figure 2 showing the rocket in loaded position.

Figure 4 is a view similar to Figure 2 showing the position of the clip immediately following advance of the rocket outwardly from the tube either upon being fired or upon being pulled forward by hand.

In the embodiment chosen for the purpose of illustration there is shown a rocket launching tube 10 of the type currently used in multiple units in a rocket launcher. A spacer block 11 is shown in broken lines in the relative position it would have to the tube when assembled with others in a launcher. A rocket 12 is illustrated by broken lines in a position in the tube in Figure 1. The rocket has a war head 13 and a cylindrical body portion 14. Of particular note is the provision of an annular retaining groove 15 located between the war head and the body and reset inwardly a short distance from an exterior surface 16 of the rocket. The war head is shown having a progressively sloping surface 17 which extends rearwardly from a rather blunt point 18 at the forwardmost end.

The detent comprises a spring metal strip 19 joined with a retainer strip spring 20. The spring metal strip and the strip spring are held together against the block 11 by a series of screws 21. It will be noted that in the embodiment shown the strip and strip spring are anchored at the aft ends and at the forward ends are free to move outwardly relative to the axis of the rocket and the tube.

At the forward end of the spring metal strip is a pair of fork spring wings 22, 23, the wings extending slightly forwardly of the forwardmost end of the strip. Secured between the forward ends of the wings is a pawl 24; a pin 25 pivotally mounts the pawl on the wings. The pawl has a particular shape in that it is provided with a groove-engaging arm 26 which extends rearwardly of the pin 25 and which is joined to the pin by a short horizontal portion 27 providing a flat shoulder 28. As will be particularly noted in Figures 2 and 3, the shoulder lies in face to face engagement with the underside of the spring metal strip 20 immediately aft of the forwardmost edge and between the mid-portions of the wings 22, 23.

Approximately above the pin 25 is a retainer boss 30 having a rearwardly facing flat abutment 31 and an obliquely forwardly facing cam face 32. It will be noted that in normal position of the pawl, as illustrated in Figures 1, 2 and 3, the abutment 31 is in engagement with the endmost and forward edge of the retainer strip spring 20. Action of the spring against the boss holds the shoulder 28 in position against the metal strip and holds the groove-engaging arm in the position shown in Figures 1, 2 and 3. This is the relationship of the parts prior to loading the tube with a rocket.

When the tube is to be loaded with a rocket, the rocket is inserted from the aft end of the tube. The rocket will be pushed forward until the ogive of the rocket engages the groove-engaging arm 26 in approximately the relative positions illustrated in Figure 2. This will tend to cam up the forward end of the detent as the rocket is slid forward until the groove-engaging arm 26 is spring-pressed into the annular retaining groove 15. This position of retention and engagement is illustrated in Figure 3. The figure represents the engagement of the detent with the rocket while the rocket is being carried by the launcher. When the rocket is fired and a predetermined initial thrust is established, namely, a thrust for which the detent is designed, the groove-engaging arm 26 will be carried forward, the action of which tends to elevate the forward end of the detent and rotate the pawl about the pin 25. This tendency is resisted for a time by the strip spring 20 until the set force has been reached, at which time the abutment 30 will press against the end edge of the spring with sufficient force to force the spring upwardly to approximately the broken line position 25, illustrated in Figure 4. When this occurs the boss will pass the end of the strip spring and the groove-engaging arm 26 will rotate around to the position illustrated in Figure 4 wherein it strikes against the top face of the strip spring 20. In that position both the groove-engaging arm 26 and the boss 30 are entirely removed from the path of the rocket and the rocket will continue being discharged without its exterior surface being marred during its passage. The pawl can be readily set whenever that resetting might be desired by merely rotating it counterclockwise as viewed in Figure 4 whereupon the cam face 32 will readily lift the strip spring sufficient to permit the boss to pass to the position illustrated in Figures 1, 2 and 3.

Should there be an occasion where the rocket is to be manually removed from the tube 10 without being fired by reason of the fact that the detent is at the forwardmost end of the rocket tube and exposed beyond the forward end of the tube, an operator can reach the strip spring 20 with the fingers and exert sufficient lift upon the spring to raise the end edge of the spring above the abutment 31 of the boss. The rocket can then be readily pulled forward, the forward movement of which is sufficient to freely rotate the pawl about the pin 25, thereby lifting the metal strip 19 sufficient to permit the rocket to be withdrawn. Again the pawl may be reset as previously described by swinging the pawl in a counter-clockwise direction.

There has been accordingly described herein a simple and effective detent or retainer for a rocket which with knowledge of the characteristics of the spring metal strip and strip spring can be adjusted with a considerable degree of accuracy to be released at any desired amount of thrust which would ordinarily be developed by the rocket during the initial firing stage. The detent moreover is one easy to manipulate by hand and readily accessible should it be necessary to unload the tube without the rocket being fired.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. In a rocket launcher comprising a tube adapted to contain a rocket having an annular configuration at the forward end thereof the combination of a rocket detent for the tube comprising a spring strip having the one end thereof adapted to be secured to the forward end of the tube and providing a free end of said strip, wing means located on the free end of the strip and extending radially inwardly toward the axis of the tube, a pawl and a pin pivotally mounting the pawl on said wing means, said pawl having a rocket-engaging arm normally extending inwardly and disposed axially of the tube relative to the axis of the pin and a shoulder on said arm adapted to abut the strip, a retainer boss on the pawl having a spring abutment, and a leaf spring having one end secured between said strip and the tube and having a free end engaging said spring abutment whereby to releasably retain said pawl in initial position subject to release by pivotal movement of the pawl about the pin.

2. In a rocket launcher comprising a tube adapted to contain a rocket having an annular retaining configuration at the forward end thereof the combination of a rocket detent for the tube comprising a spring strip having an aft end thereof adapted to be secured to the forward end of the tube with a free end of said strip extending forwardly, wing means located on the free end of the strip and extending radially inwardly toward the axis of the tube, a pawl and a pin pivotally mounting the pawl on said wing means, said pawl having a configuration-engaging arm normally extending inwardly and rearwardly of the pin and a shoulder on said arm adapted to abut said free end of the strip, a retainer boss on the pawl extending outwardly of the pin and having a spring abutment thereon, an obliquely forwardly facing loading cam, and a retainer leaf spring having one end secured between said strip and the tube and having a free end engaging said spring abutment whereby to releasably retain said pawl in initial position subject to release by pivotal movement of the pawl about the pin.

3. A rocket launcher comprising a tube adapted to contain a rocket having an annular retaining groove at the forward end thereof the combination of a rocket detent for the tube comprising a spring strip having the aft end of the strip adapted to be secured to the forward end of the tube with a free end of said strip extending forwardly of the tube, a pair of fork spring wings located one on each side of the free end and extending radially inwardly toward the axis of the tube, a pawl and a pin pivotally mounting the pawl between said wings, said pawl having a groove-engaging arm normally extending inwardly and rearwardly of the pin, and a shoulder on said arm adapted to abut the inner face of the free end of the strip, a retainer boss on the pawl initially extending outwardly of the pin and having a rearwardly facing spring abutment and an obliquely forwardly facing loading cam, a retainer leaf spring having one end secured between said strip and the tube and having a free end engaging endwise with said spring abutment whereby to releasably retain said pawl in initial position subject to release by forward movement of a rocket, said pawl in released position having said groove engaging arm and said boss in positions outward relative to the location of the wall of the tube and out of the path of the rocket.

References Cited in the file of this patent

UNITED STATES PATENTS

| | | |
|---|---|---|
| 2,460,929 | Goff | Feb. 8, 1949 |
| 2,690,124 | Melick | Sept. 28, 1954 |